Oct. 10, 1933.  A. RANG  1,930,107
SAFETY VALVE FOR ACETYLENE TORCHES
Filed March 17, 1932
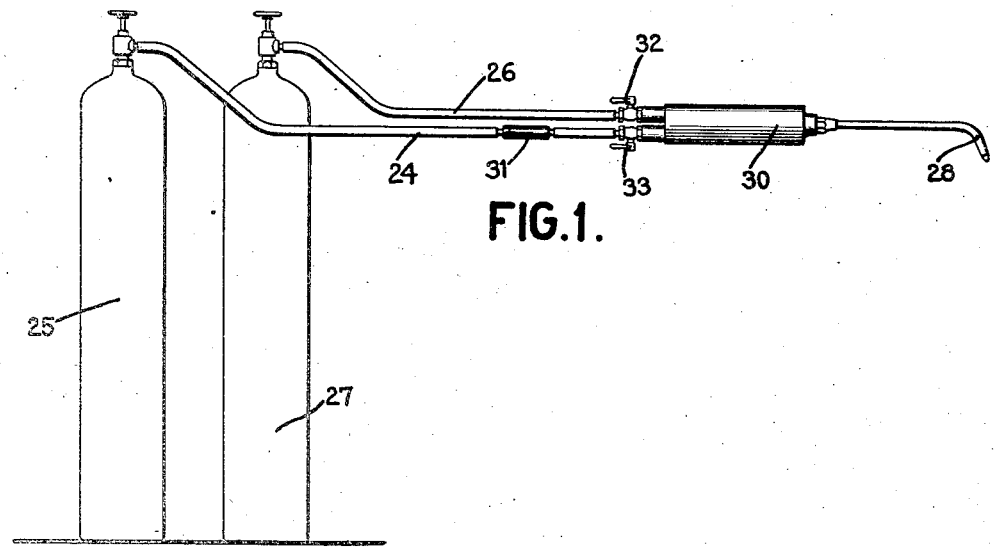
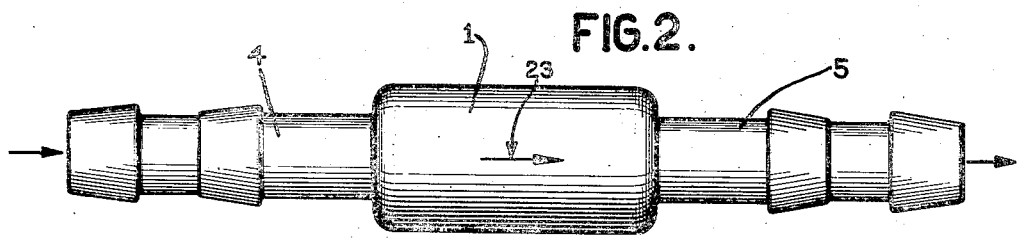
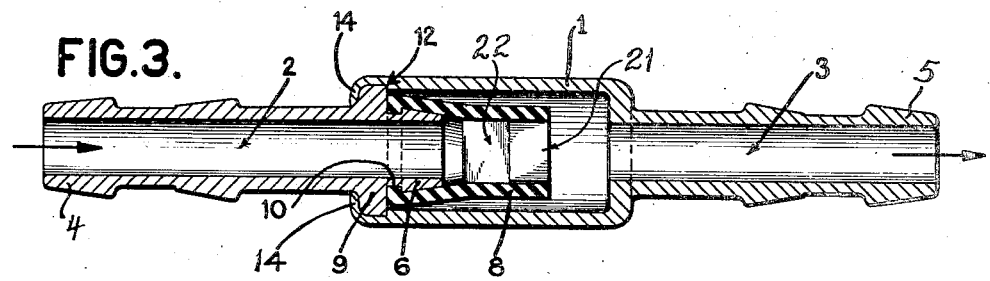
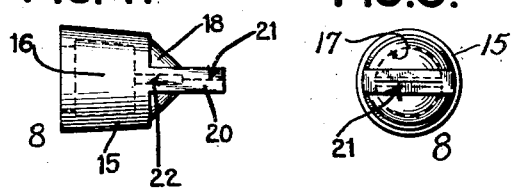 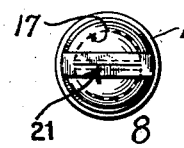 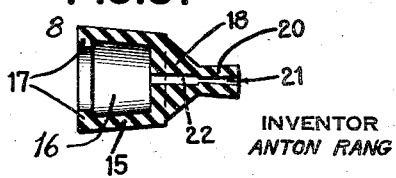
INVENTOR
ANTON RANG
BY
Bohleber + Ledbetter
ATTORNEYS Patented Oct. 10, 1933

1,930,107

UNITED STATES PATENT OFFICE 1,930,107

SAFETY VALVE FOR ACETYLENE TORCHES

Anton Rang, Hamburg, Germany

Application March 17, 1932, Serial No. 599,455, and in Germany June 6, 1931

1 Claim. (Cl. 251—122)

The present invention relates broadly to safety valves for gas conduits more especially the conduits for combustible or explosive gases and for use in connection with acetylene and autogenous welding plants.

It is frequently necessary to mix a combustible or explosive gas with oxygen or an oxygen containing gas and for this purpose the respective gases are led from suitable containers through respective conduits into a gas burner. For example in welding processes, a combustible gas, for example acetylene or hydrogen, and an oxygen containing gas which may be oxygen in a greater or lesser degree of purity, are led from respective containers through flexible conduits to a mixing device and burner to supply the desired gas mixture for attaining high temperatures by combustion. Disastrous explosions have not infrequently occurred in the use of such apparatus caused by leakage of the oxygenous gas into the acetylene container or in any event by accidental or premature admixture of the acetylene and oxygenous gas. Until the present invention, the welding art appears to have been devoid of any cheap, compact, commercially satisfactory and successful safety valve for the prevention of the accidents mentioned and it is an object of the present invention to supply this need.

In its broader aspects the invention comprises an automatic safety valve having entrance and exit ports of which the entrance port is arranged to be connected to a source of gas supply or to a conduit leading from that source and the exit port is arranged to be connected to means for consuming that gas such as a gas burner or to a conduit leading to such gas consuming means. Between the entrance and exit ports automatic means for controlling the direction of the flow of gas is placed. The function of this means broadly is to freely permit the flow of gas from the container therefor to the gas consuming means or burner and to prevent entirely the flow of gas in the reverse direction. In other words, the valve may be characterized as a check valve permitting uni-directional flow only.

In the preferred form of the invention the valve comprises a housing to which the entrance and exit ports are connected, together with a nipple which extends from the entrance port into the housing. The end of this nipple within the housing is provided with a yieldable closure which preferably comprises a flexible collapsed sheath. When the entrance port of the valve is connected to the source of gas the nipple and its closure, just described, point away from the gas container and gas can readily flow from the container and through the valve because the collapsed sheath readily opens by separation of the walls thereof to permit the flow of gas in the direction described. Gas flow in the reverse direction however, is practically impossible because any tendency to reverse the flow merely acts to press together the walls of the sheath and to effectively prevent passage of gas through the closure which comprises the said sheath. It will thus be seen that the walls of the sheath may readily be separated by pressure exerted against the inside walls of the sheath to permit the gas flow in one direction, whereas a gas flow in the reverse direction exerts a pressure upon the outside walls of the sheath and more effectively seals these walls together.

In certain other arts the general notion of using a collapsed sheath to establish a uni-directional flow of fluids has been employed in order to prevent fluids from escaping from containers while permitting fluids to enter the containers. In the present invention on the contrary, the idea is precisely the opposite because the structure and function of the valve in the present invention is such as readily to permit fluids to escape from a gas tank but to prevent fluids from entering the same. In other words, the broad idea in the present invention is to let gas out of a container but not to let it in, whereas in certain other devices in other arts, the function and structure of these devices has been such as to let the gases in but not to let them out.

It is therefore considered that the present invention constitutes a marked and radical advance in the art of safety valve devices as applied to gas lines and gas conduits broadly and to the gas lines used in oxy-acetylene welding specifically. It is considered that the invention is not a mere slight advance in a crowded art but rather a reversal in the trend of previous thought and a pioneer invention in the particular art to which it relates.

The invention however, in addition to its broad aspects has certain important specific features all as will be more fully hereinafter described and claimed. A specific valve structure has been evolved which is economical to manufacture, highly efficient and convenient for practical use and thoroughly reliable.

The invention and a specific embodiment thereof will be described in greater detail by reference to the accompanying drawing.

Figure 1 shows an assembly of apparatus embodying the invention and including an acetylene tank 25, an oxygen tank 27, a burner 28, a gas mixing device 30, flexible conduits 24 and 26 connecting the gas mixing device 30 with the acetylene tank and oxygen tank, respectively, the safety valve 31 in the acetylene line 24 and gas cocks 32 and 33.

Figures 2 and 3 show enlarged views of the safety valve, Figure 2 being an elevational view and Figure 3 a sectional view.

Figures 4, 5 and 6 are detailed views of the yieldable sheath, lip or self closing gland means which constitutes an important part of the safety valve.

The valve comprises a housing in the form of a cylindrical shell 1 together with an entrance port 2 and exit port 3, these ports being situated in corresponding nipples 4 and 5 which as shown, are provided with annular bevelled rings or corrugations to provide a tight connection with rubber hose lines. The nipple 4 extends into the interior of the housing 1 and is provided with an integral bevelled annular ring member or flanged neck 6 cooperating with or joined to a yieldable sheath 8. The extension of the nipple is also provided with an annular disk-like shoulder or flange forming a closure head 9. Between the latter and the bevelled annular member 6 there is located an annular groove or depression 10. The shoulder 9, the annular groove 10 and the bevelled annular member 6 all cooperate with the flexible sheath 8 as will be more fully hereinafter apparent and explained.

One of the features of the specific structure of the safety valve according to the present invention is the fact that the nipples and housing are essentially one integral structure. Consequently after the respective parts of the valve are mounted and the latter is placed upon the market, it is impossible for workmen to take it apart and tamper with it and the adjustment of the valve at the factory cannot therefore be interfered with. This result is accomplished during manufacture of the valve with the following steps or operations.

After the flexible lip valve or sheath 8 is mounted upon the extension of the nipple 4 the latter is inserted into the housing 1 until the shoulder 9 abuts tightly against a cooperating shoulder 12 in the wall of the housing. Thereafter the edges 14 of the housing, having a thickness less than that of the other portions of the housing, are spun and swaged against the shoulder 9, thus making a gas tight joint and uniting the housing 1 with the nipple 4 in such a manner that these members cannot subsequently be readily separated. It would be possible to have a screw connection or cap connection instead of a spun joint but the latter structure is much to be preferred.

Having now described the valve housing with its entrance and exit ports, attention will be more specifically directed to the yieldable closure or lip valve member 8, the details of which are shown in Figures 3, 4, 5 and 6.

In the preferred form of the invention this member 8 comprises a rubber cap or closure adapted to fit snugly over the bevelled annular member 6. The walls 15 enclose a chamber 16 having an opening somewhat less in diameter than the largest diameter of the chamber leaving an annular shoulder or ring 17. The walls 15, chamber 16 and ring 17 thus form the female counterparts of the male members 6 and 10 and, as shown, the walls 15 and ring 17 fit snugly over the bevelled member 6 and annular depression 10 and against the shoulder 9. An extension of the walls 15 constitutes the conical member 18 and the lips 20 in which lips is located a slit 21 so that the lips 20 form essentially a collapsed sheath. The slit 21 communicates with the chamber portion 16 of the closure through a second slot 22 which is somewhat wider than the slit 21.

When the closure is mounted as shown in Figure 3 and the valve assembled as described the lips 20 will open only as a result of gas flow in the direction of the arrows. Gas flow in the reverse direction serves only to compress the lips together and they then act effectively as a seal to prevent gas flow in the reverse direction. It is therefore of great importance to mount the lip valve 8 on the inlet nipple 4 with the lips 20 pointing toward the outlet nipple 5 and to mount the safety valve in the gas line in such a way that the lips 20 will point away from the source of gas in the container and to this end a suitable mark is placed upon the outside of the valve. For example the arrow 23 shows the direction in which the lips point and the valve must be mounted in the gas line so that this arrow points in the direction in which it is desired to have the gas flow.

In the finished valve in its preferred form, there are essentially only two parts, i. e. the housing and nipples, and the yieldable closure. The former may be made of any suitable metal preferably a non-corroding or rust proof metal such as brass, and the yieldable closure or collapsed sheath 8 is preferably made of a good grade of soft vulcanized rubber or other appropriate resilient material. It will thus be observed that the device is characterized by marked simplicity and that to all intents and purposes it is fool proof inasmuch as there is practically nothing to corrode or get out of order. The resilient lip valve has a much longer life than check valves of metal and the like and is extremely sensitive to slight pressures caused by flow of gas in the direction indicated by the arrows. It will be observed that the conical portions 18 are very thick walled and that a recess or slot 22 is provided. This slot 22 acts as a recess in which gas may accumulate and against the walls of which the pressure of gas is exerted to cause those walls to expand and thereby open the much narrower slit 21 between the lips 20. It will thus be seen that the relatively wide slot 22 cooperates with the surrounding walls 18 and with the lips 20 and as a result of this specific structure it has been found that these lips respond in a very sensitive manner to slight differences in pressure and readily permit gas to flow in the proper direction although absolutely preventing gas flow in the opposite direction.

Referring more particularly to Figure 1, in assembling the finished valve, it is preferably placed as shown in the gas line 24 leading from the tank 25 containing acetylene or other combustible gas although it may be placed in either of the gas lines 24 or 26 or in both.

The invention comprises not only the valve structure per se but also the combination of that structure with a source of gas and with a gas consuming device as described and also includes the method of manufacturing the valve.

This invention insures the safety of the operators using acetylene and autogenous welding apparatus because dangerous and self igniting explosive gas mixtures cannot be formed in either or both of the hose lines 24 and 26 in which the undirectional flow valve is included. In case of possible obstruction in the burner 28 or gas mixing device 30, there exists the likelihood that gas from one hose line 26 might enter the other hose 24 and lead to disastrous self ignition, but this invention effectively eliminates this danger by preventing the oxygen in line 26 from entering the gas line 24 and its supply bottle 25.

The broader aspects of the invention have been described and certain preferred embodiments thereof have been set forth in detail so as to adequately instruct those skilled in the art. The appended claim is intended to define the invention but not to limit it to exclude changes which may be made by those skilled in the art with the assistance of the teachings and information herein contained.

What is claimed is:

A safety valve comprising an inlet nipple, a bevelled integral annular neck at one end thereof, an integral disk-like shoulder having a diameter substantially greater than the diameter of the annular neck and fully exposing the bevelled integral annular neck, a rubber closure snugly fitting over the annular neck, a cylindrical housing having an open end insertable over the said closure and disk-like shoulder, an annular shoulder adjacent the open end of the cylindrical housing and abutting against the disk-like shoulder on the inlet nipple, the edges of said housing being drawn over the disk-like shoulder on the inlet nipple and spun over the end thereof to form a permanently closed housing, and an outlet nipple integral with said housing, the said closure comprising a resilient lip valve which readily opens to allow gas to pass from the inlet nipple to the outlet nipple and which prevents gas flow in the reverse direction.

ANTON RANG.